United States Patent
Ip et al.

(10) Patent No.: US 12,063,305 B2
(45) Date of Patent: Aug. 13, 2024

(54) METHODS AND APPARATUS TO MANAGE APPLICATION ACCESS IN NETWORKED ENVIRONMENTS

(71) Applicant: Shopify Inc., Ottawa (CA)

(72) Inventors: Jessica Wai Yan Ip, Etobicoke (CA); Shawn Haywood, Markham (CA)

(73) Assignee: SHOPIFY INC., Ottawa (CA)

(*) Notice: Subject to any disclaimer, the term of this patent is extended or adjusted under 35 U.S.C. 154(b) by 214 days.

(21) Appl. No.: 17/184,490

(22) Filed: Feb. 24, 2021

(65) Prior Publication Data
US 2022/0271938 A1    Aug. 25, 2022

(51) Int. Cl.
  *H04L 9/32*  (2006.01)
  *G06N 20/00*  (2019.01)
  *H04L 9/40*  (2022.01)

(52) U.S. Cl.
  CPC ........... *H04L 9/3228* (2013.01); *G06N 20/00* (2019.01); *H04L 63/108* (2013.01)

(58) Field of Classification Search
  CPC ... H04L 9/3228; H04L 63/108; H04L 63/102; G06N 20/00; G06F 21/604; G06F 9/4482; G06Q 30/0641
  USPC .......................................................... 726/7
  See application file for complete search history.

(56) References Cited

U.S. PATENT DOCUMENTS

| | | | | |
|---|---|---|---|---|
| 11,253,785 | B1* | 2/2022 | Niknafs | A63F 13/335 |
| 11,494,479 | B2* | 11/2022 | Varghese | G06F 21/6218 |
| 11,539,524 | B1* | 12/2022 | Ramanujan | H04L 63/083 |
| 2006/0274939 | A1* | 12/2006 | Yamada | H04N 1/0087 382/175 |
| 2017/0099292 | A1* | 4/2017 | Kelley | H04L 63/10 |
| 2019/0114444 | A1 | 4/2019 | Caldwell | |
| 2020/0074067 | A1 | 3/2020 | Varghese et al. | |
| 2021/0044595 | A1 | 2/2021 | Childress et al. | |

FOREIGN PATENT DOCUMENTS

EP  3643033  4/2020

OTHER PUBLICATIONS

IP.com, Journal, May 13, 2016 "System to Manage Users' Accounts and Owned Data on Events Occurrences", pp. 1-7 (Year: 2016).*
Phillip J. Windley, 2015 IEEE, "API Access Control with OAuth Coordinating interactions with the Internet of Things", pp. 52-58 (Year: 2015).*

(Continued)

*Primary Examiner* — Khalil Naghdali
(74) *Attorney, Agent, or Firm* — Foley & Lardner LLP

(57) ABSTRACT

Methods, apparatus, systems, and articles of manufacture to manage application access in networked environments are disclosed. An example method includes monitoring accesses made using a credential to a first set of one or more application programming interfaces (APIs) and with a second set of one or more APIs, the credential associated with a first permission for access to the first set of one or more APIs and a second permission for access to the second set of one or more APIs, determining, based on access to one or more APIs of the first set of one or more APIs using the credential, that the first permission is to be suspended, and in response to the determination that the first permission is to be suspended, suspending the first permission while maintaining the second permission.

19 Claims, 12 Drawing Sheets

(56) References Cited

OTHER PUBLICATIONS

European Patent Office, "Extended European Search Report," issued in connection with Application No. 21192676.1, dated Feb. 14, 2022, 6 pages.
Josmy Joseph, "OKTA Help Center Questions," https://support.okta.com/help/s/question/0D51Y00008ch3GaSAI/okta-api-key-expired-after-30-days?language=en_US, Jun. 2, 2020, 2 pages.
Okta Help Center, "API Token Management," https://help.okta.com/en/prod/Content/Topics/Security/API.htm, 2021, 3 pages.
Examiner's Requisition on CA App. 3,139,013 dated Nov. 10, 2023 (6 pages).
Examiner's Report dated Apr. 15, 2024 on EPO App. 21192676.1 (5 pages).

* cited by examiner

FIG. 2

METHODS AND APPARATUS TO MANAGE APPLICATION ACCESS IN NETWORKED ENVIRONMENTS

FIELD OF THE DISCLOSURE

This disclosure relates generally to applications in networked environments, and, more particularly, to methods and apparatus to manage application access in networked environments.

BACKGROUND

Users of a computing environment (e.g., users of a software as a service system, a web-based service, etc.) often give permission to data accessors (e.g., entities/applications ("apps")/services) by assigning permissions to credentials granted to those data accessors. The credentials are used for taking action or accessing information (e.g., data sets) maintained by the computing system. For example, a user may install an application within a computing environment and provide the application permission to access a software interface (e.g., an application programming interface, a datastore interface, etc.).

BRIEF DESCRIPTION OF THE DRAWINGS

FIG. 2 is an illustration of an example home page of an administrator of the e-commerce platform of FIG. 1.

Figure 1:
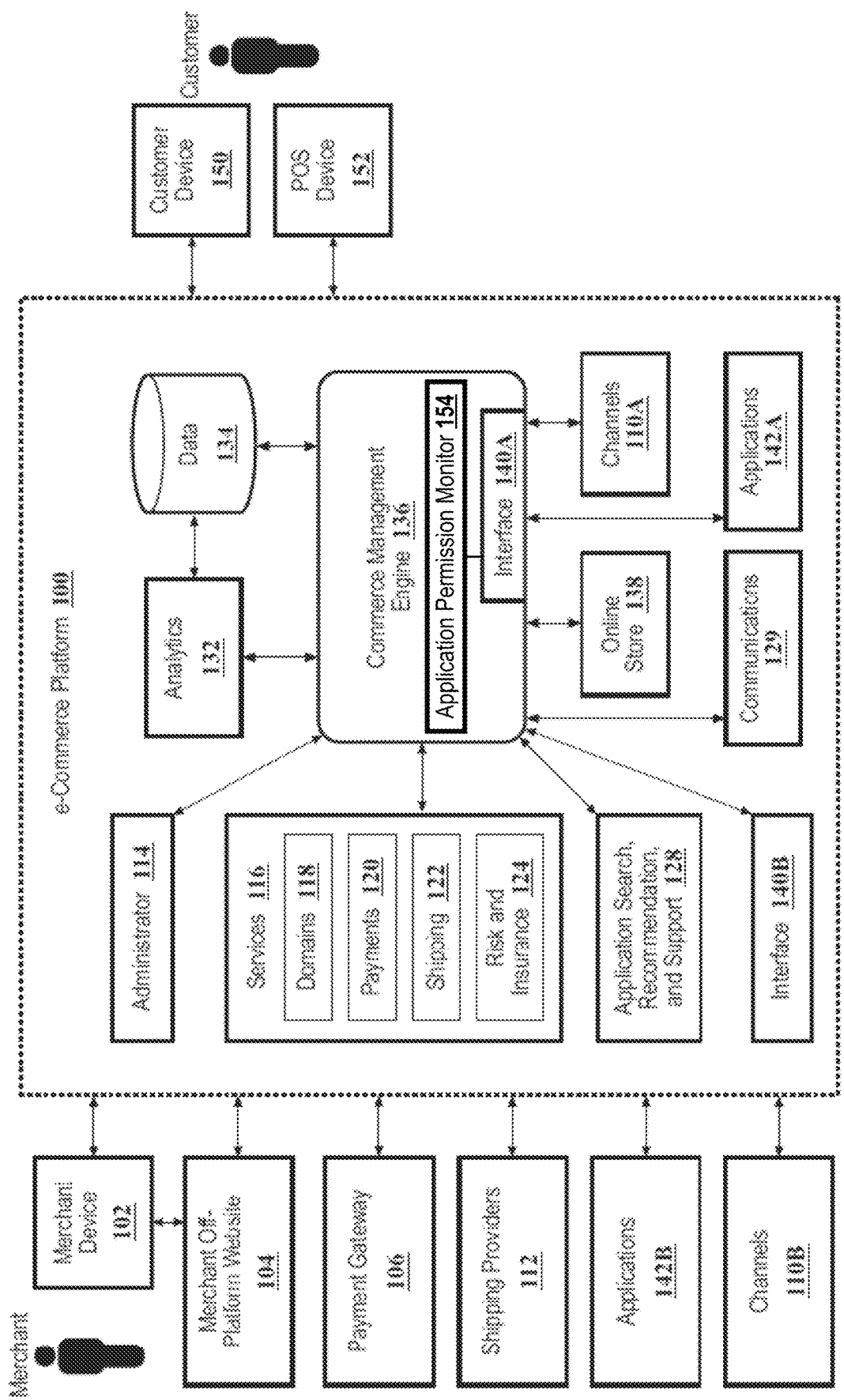
FIG. 1 is a block diagram of an example e-commerce platform.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In computing environments that include permissions for data accessors to access software interfaces, an initial permission may be assigned at the time a connection between the computing environment and the data accessor is first established. For example, the initial permission may include a first permission to access data set A and a second permission to access data set B. The owner of the computing system and/or the data accessors may over-assign permissions at the time the connection is established (e.g., may assign permissions to the application that are not needed). Furthermore, after establishing the connection, data accessor permission needs may change (e.g., the application may be modified, the user may turn off the application, the user may turn off a feature of the application, etc.). Thus, the data accessors may stop (or may never begin) accessing data set B. Accordingly, at that subsequent time, the data accessors have access to information (e.g., have a valid permission) that they do not need. In some examples, the multiple permissions may be associated with a single credential. For example, a credential may be assigned to an application and that credential may be associated with multiple permissions (e.g., a first permission to access a first interface or other type of resource and a second permission to access a second interface or other type of resource).

For example, e-commerce merchants may be unfamiliar with third party, private apps (data accessors) connected with their store. These third-party apps access merchant data through one or more application programming interfaces (APIs). Accordingly, a merchant may be unfamiliar with the data access available to the developers of installed third party apps. Thus, third party developers may have unneeded access to sensitive customer or order data of the merchant's store, which is an inherent risk to the merchant.

There is a need to provide a way for credentials granted to a data accessor for a computing environment to be easily monitored and managed (scoped). Particularly, there is a need for permissions to be monitored in an ongoing manner as the use and needs of data accessors change over time. Permissions that are no longer needed and/or are not used should be automatically suspended or blocked without the need for users/administrators to manually review and understand the permissions given to each data accessor.

Methods and apparatus disclosed herein facilitate the review and analysis of permissions assigned to applications to determine if some or all permissions should be suspended, revoked, restricted, etc. In some examples, permissions that have not been utilized for a threshold period of time are suspended, revoked, deactivated, etc. while permissions that have been utilized are maintained (e.g., not suspended). For example, first permissions associated with a credential may be suspended while second permissions associated with the credential may be maintained. Many different heuristics for determining if a permission of a credential should be suspended may be utilized. For example, the threshold period of time may be determined based on historical statistical and/or patterns of access, a type of the application, a status of a user or site associated with the permission and/or application, a predetermined value, etc. In at least some implementations, a user associated with a permission and/or application, etc. may be a registered user. An association of the registered user with the application may correspond to the registered user installing and granting permissions to an account. Notably, detecting that a registered account is later frozen, disabled, or removed, may be considered a signal supportive of reducing or suspending permissions associated with the application, even if that application continues to actively retrieve data via some or all of the previously granted permissions. In some implementations, if a user responsible for installing an app is deleted, suspended, etc., some or all of the permissions associated with apps installed by that account may be automatically revoked.

In some examples, when a permission is determined to be suspended, a notification may be presented to facilitate a user or administrator providing an input confirming the suspension or rejecting the suspension. In some examples, a suspended permission is removed from the credential while in other examples a suspended credential may be flagged for restricted access to enable the permission to be reactivated by removing the flag. Example methods and apparatus disclosed herein prevent permissions that are not actively in use and/or otherwise un-needed from remaining with a credential and/or application. For example, if permissions may be initially assigned to an application but may decay overtime to leave a set of permissions that are actually needed by the application.

As used herein, an API may comprise a set of APIs. For example, an Orders API may include a first API for retrieving Orders data and a second API for modifying Orders data. A first API may comprise a first set of APIs and a second API may comprise a second set of APIs that does not overlap with the first set of APIs.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The subject matter of the present application may be applied in a variety of application scenarios. For example, the subject matter of the present application may be employed in association with an e-commerce platform. Accordingly, an example e-commerce platform will now be described with regards to FIGS. 1 and 2.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multi-tenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 (e.g., a financial facility, platform payment facility) for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

The example commerce management engine 136 includes an example application permission monitor 154 to manage permissions that are assigned to applications (e.g., the applications 142A and/or the applications 142B). In particular, the application permission monitor 154 of the illustrated example manages the permission of the applications 142A, 142B to access data via the interface 140A. When the applications 142A, 142B are assigned multiple permissions (e.g., a credential assigned to the application is assigned a first permission to access a first API and a second permission to access a second API), the application permission monitor 154 analyzes the permission individually to determine if they should be maintained and/or suspended. For example, the application permission monitor 154 may determine that: A) a first permission assigned to one of the applications 142A, 142B should be suspended because the permission has not been utilized for a threshold period of time and B) a second permission assigned to the one of the applications 142A, 142B should be maintained (e.g., not suspended) because the permission has been utilized within the threshold period of time (e.g., or another threshold associated with the second permission).

The example application permission monitor 154 analyzes a history of utilization of the interface 140A by the applications 142A, 142B to determine if permissions should be suspended. In accordance with the methods and apparatus disclosed herein, the history of utilization may include an amount of time since a last access of the interface 140A, a pattern of access of the interface 140A, a frequency of access of the interface 140A, etc. In addition to analyzing the history of utilization of the interface 140A, the application permission monitor may gather additional information about the environment, the permissions, and the applications 142A, 142B to determine if a permission should be suspended. For example, the application permission monitor 154 may determine a type of the applications 142A, 142B (e.g., security application, marketing application, business intelligence, application, advertising application, content provider application, etc.), a status of the e-commerce platform 100 (e.g., active, inactive, etc.) with which the applications 142A, 142B are associated, a status of a user that installed the applications 142A, 142B and/or assigned permissions to the applications 142A, 142B, etc. The history of utilization and/or the information about the environment, permissions, and/or applications 142A, 142B may be utilized separately and/or collectively to determine if a permission should be suspended.

According to the illustrated example, the application permission monitor 154 is software implemented within the commerce management engine 136 (e.g., implemented by the machine-readable instructions illustrated in FIGS. 6-10). Alternatively, the application permission monitor 154 may be implemented as a device separate from and communicatively coupled to the example commerce management engine 136 (implemented by the machine-readable instructions illustrated in FIGS. 6-10 executed on the processing platform 1100 illustrated in FIG. 11). Alternatively, the application permission monitor 154 may be implemented by any other type of circuitry such as, for example, one or more analog or digital circuit(s), logic circuit(s), programmable processor(s), ASIC(s), PLD(s), FPLD(s), programmable controller(s), GPU(s), DSP(s), CGRA(s), ISP(s), etc. An application implementation of the application permission monitor 154 is described in further detail in conjunction with FIG. 4.

While the example application permission monitor 154 is described in connection with the example e-commerce platform 100, the methods and apparatus disclosed herein may be utilized with any type of networked computing environment. For example, the application permission monitor 154 may monitor and manage permissions for applications, plugins, clients, etc. that access information (e.g., via a software interface such as an API) on a Software as a Service (SaaS) platform, on a cloud computing environment, on a server, etc.

Figure 2:
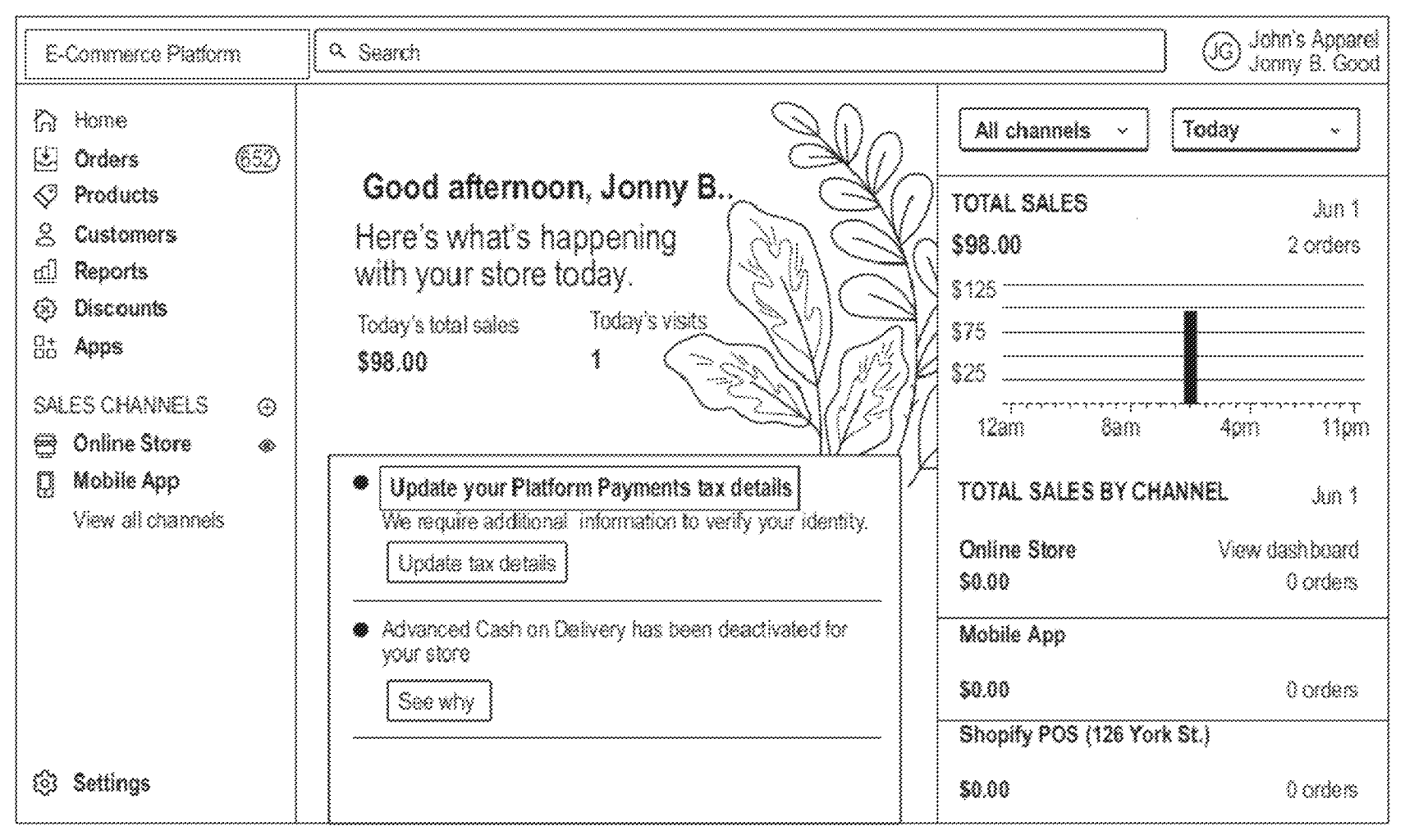

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports, and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code, and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast-growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation, and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there were any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Figure 3:
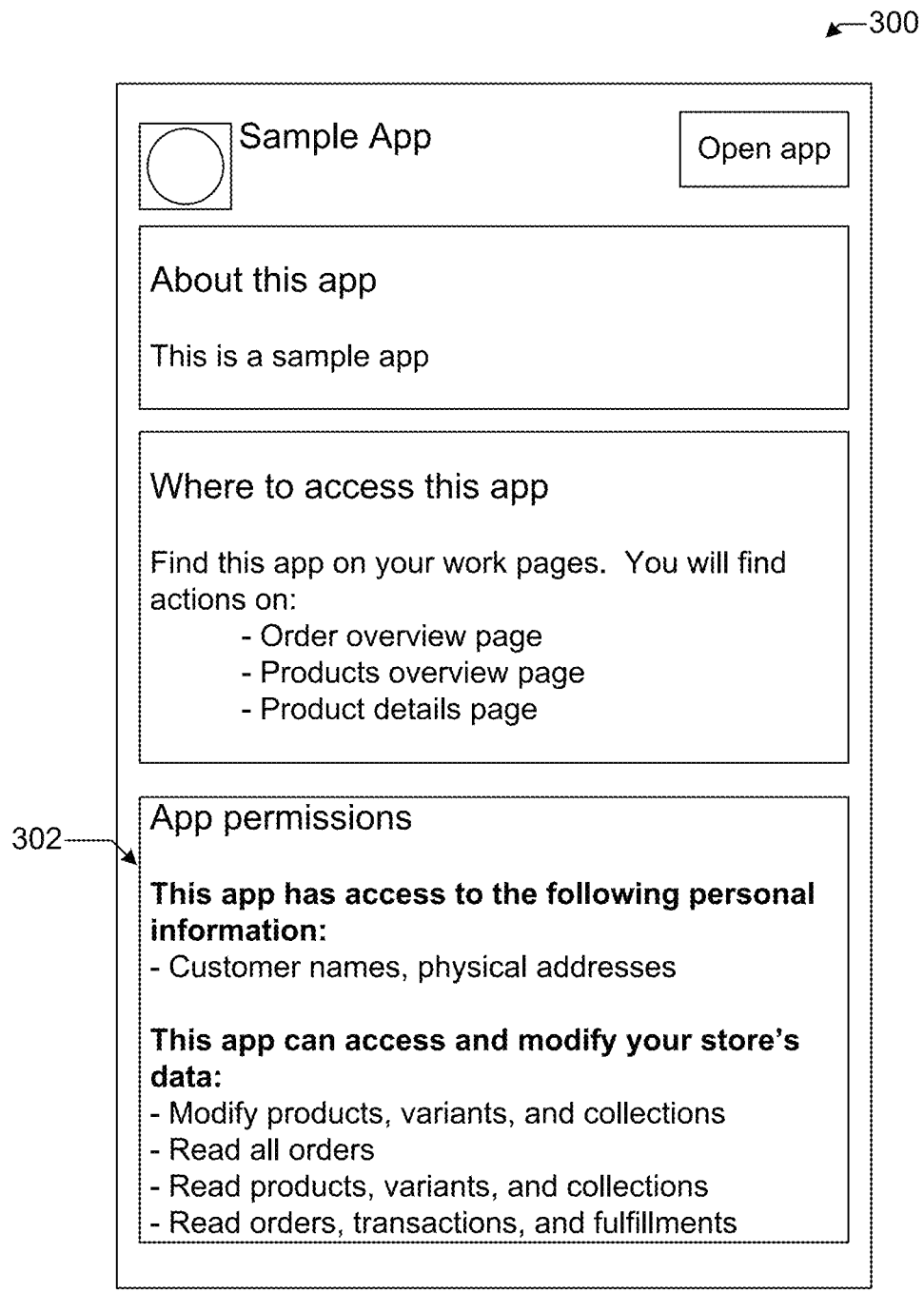
FIG. 3 is an illustration of an example information page identifying information for an application of the e-commerce platform of FIG. 1.

FIG. 3 depicts a non-limiting embodiment for an interface 300 for viewing information about an application (e.g., one of the applications 142A, 142B) that may be provided to the administrator 114 by the e-commerce platform. As illustrated in the example interface 300 of FIG. 3, a set of application permissions 302 may be associated with an application (e.g., the applications 142A, 142B). According to the illustrated example, the "Sample App" has been assigned permission to "Modify products, variants, and collections," "Read all orders," "Read products, variants, and collections," and "Read orders, transactions, and fulfillment." Such permissions may be associated with individual permissions (e.g., a first permission to provide access to "orders" and a second permission to provide access to "products") and/or permissions may be bundled (e.g., a single permission that provides access to customer data and order data).

Permissions (such as the permissions 302) for an application may be assigned/edited/revoked by the administrator 114 (e.g., during deployment of an application and/or after an application is deployed). For example, a credential (e.g., a username/password, an API key, an authentication key, a certificate, etc.) may be assigned/associated with one or more permissions that authorize a user of the credential to take an action (e.g., to retrieve data using an interface). Alternatively, permissions (e.g., default permissions) may be pre-assigned to an application in a repository (e.g., in an application store) and may be automatically assigned/associated therewith (e.g., assigned to a generated credential) during deployment of the application. In some instances, permissions that are not necessary for operation of an application may be assigned (e.g., the administrator 114 and/or a developer of the application may assign permissions that are not required for operation of the application due to a misunderstanding of the needed permissions, etc.). Additionally, the permissions needed by an application may change over time (e.g., operation of the application may be changed (e.g., by the application developer and/or the administrator 114) such that a permission that was once needed is no longer needed). Accordingly, the application permission monitor 154 monitors permissions to identify opportunities to suspend permissions that are no longer needed, are no longer actively being used, are inconsistent with a type of the application, etc. For example, while FIG. 3 illustrates that the Sample App has access to Customer data and Order data, access to the Order data may not be needed. For example, an application may accidently be assigned permissions that are not needed, a change to the application by an administrator may cause the Sample App to not access some data (e.g., to not access the Order data), etc. Accordingly, methods and apparatus disclosed herein detect opportunities to revoke/suspend permissions to scale back the set of permission assigned to an application (e.g., the set of permissions associated with a credential utilized by the application when accessing data (e.g., accessing data via the interface 140A of FIG. 1). Further, such superfluous/unneeded permissions may be automatically revoked/suspended.

Figure 4:
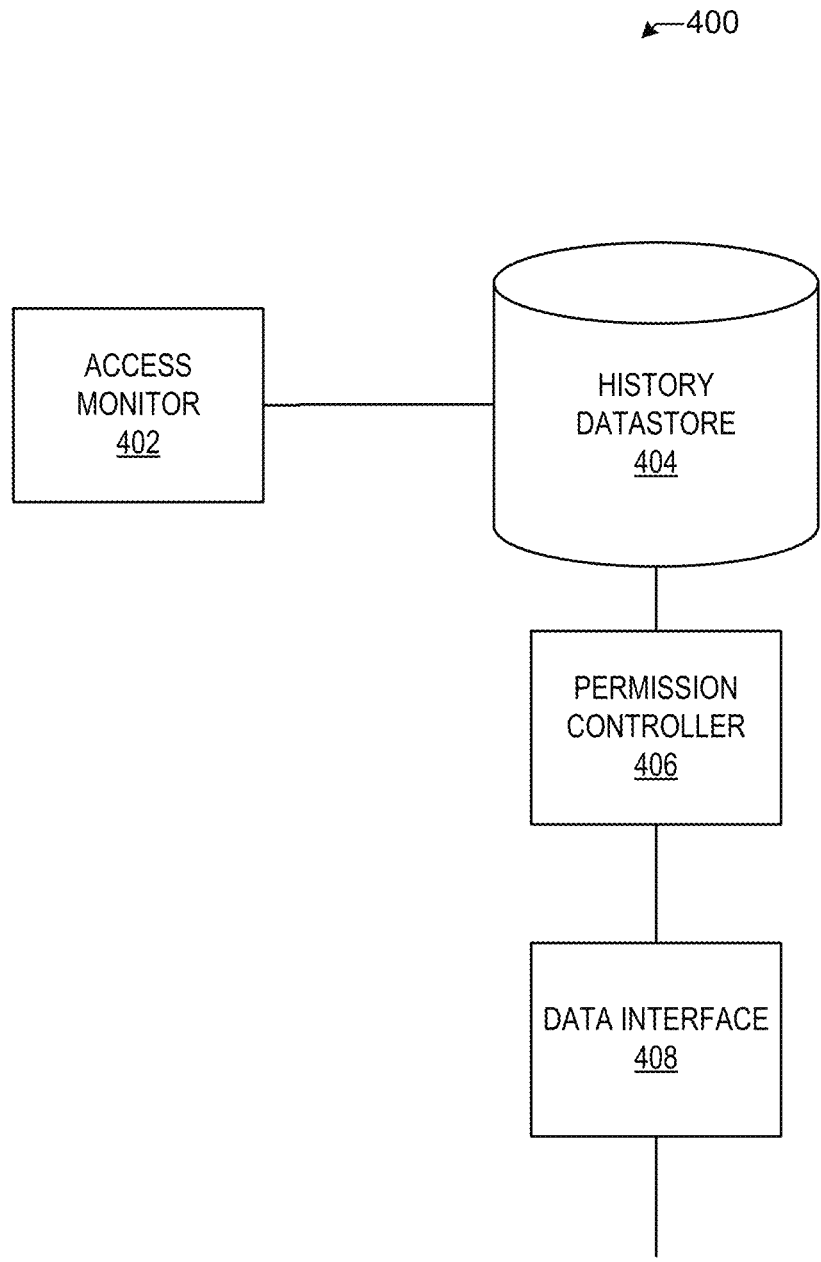
FIG. 4 is a block diagram of an example implementation of the application permission monitor of FIG. 1.

FIG. 4 is a block diagram of an example implementation of the application permission monitor 154 of FIG. 1. The example application permission monitor 154 of FIG. 4 includes an example access monitor 402, an example history datastore 404, an example permission controller 406, and an example data interface 408.

The example access monitor 402 monitors access to the interface 140A (e.g., access by the applications 142A, 142B) to record a history of the access in the example history datastore 404. The example access monitor 402 may additionally monitor any other interfaces or accesses by the applications 142A, 142B, by other applications, by plugins, etc. The example access monitor 402 stores a log of accesses (e.g., an indication of the application, an indication of the particular permission utilized, an indication of the particular interface accessed, and a timestamp) in the history datastore 404. Alternatively, any subset and/or additional information may be stored. For example, the access monitor 402 may keep track of only the latest access by a particular combination of application and permission (e.g., may overwrite an entry in the history datastore 404 each time an access is detected).

In some examples, the access monitor 402 implements example means for monitoring. The means for monitoring is implemented by executable instructions such as that implemented by at least blocks 602-604 of FIG. 6. The executable instructions of blocks 602-604 of FIG. 6 may be executed on at least one processor such as the example processor 1112 of FIG. 11. In other examples, the means for monitoring is implemented by hardware logic, hardware implemented state machines, logic circuitry, and/or any other combination of hardware, software, and/or firmware.

The example history datastore 404 is a database for storing history information collected by the access monitor 402. The example database is stored on a storage device communicatively coupled to a computing device (e.g., the processing platform 1100 of FIG. 11). The example database includes a table with multiple columns including: application identifier (e.g., a name, number, or other unique identifier of an application), permission identifier (e.g., a name, number, or other unique identifier of a permission), interface accessed (e.g., a name, number, or other unique identifier of an interface, API, software interface, etc. that was accessed), and timestamp. Alternatively, any other type of datastore and/or data structure may implement the history datastore 404 such as, for example, one or more files, one or storage devices, one or more memory devices, one or more removable storage devices, one or more virtual storage devices, one or more cloud storage devices, etc. and/or any combination thereof.

In some examples, the example history datastore 404 implements example means for storing data. The means for storing data is implemented by a database stored on a storage device (e.g., disk storage device, flash storage device, etc.). In other examples, the means for storing data is implemented by one or more data structures stored on a disk storage device, a flash storage device, a memory device, and/or any combination thereof.

The example permission controller 406 analyzes available information associated with permissions to determine if permissions associated with an application, plugin, etc. should be suspended (or maintained). The example permission controller 406 accesses information stored in the history datastore 404 and information available via the example data interface 408 to determine if a permission should be suspended. For example, in some embodiments, the permission controller 406 determines that a permission should be suspended when the information in the history datastore 404 indicates that the permission has not been utilized for a threshold period of time. In some embodiments, the permission controller 406 determines that a permission should be suspended based on information retrieved from the analytics 132, information retrieved from the data 134, information retrieved from the online store 138, and/or information retrieved from the interface 140A.

The example permission controller 406 may utilize any combination of the following approaches for determining that a permission should be suspended (or maintained). In some examples, the approaches may be combined using weighting (e.g., weights set by the administrator 114 and/or weights determined using machine learning analysis of the available information associated with applications and permissions in the e-commerce platform 100 and/or learned across multiple e-commerce platforms). Example approaches:

Suspend a permission that has not been utilized for a threshold period of time. For example, if a credential is associated with multiple permissions (e.g., a first permission to access an Orders database and a second permission to access a Customer database), permissions that have been used within a threshold period of time are maintained (e.g., the permission to access Orders database may be maintained if it has been utilized in the past 30 days) and permissions that have not been used within the threshold period of time are suspended/revoked/removed (e.g., the permission to access the Customer database may be suspended if it has not been utilized in the past 30 days). In some examples, the threshold is determined by calculating a historical average duration of time between accesses utilizing a permission and adding a percentage of that average to the average, by calculating a maximum historical duration of time between accesses, by determining a $99^{th}$ percentile (or other percentile) historical time between accesses, by calculating a $3^{rd}$ standard deviation (or other standard deviation) of historical duration of time between accesses. In some examples, the threshold is determined by determining a historical average duration between accesses for applications having a same type as the application for which the permission under analysis is assigned and add a percentage of the average to the average to determine the threshold. In some examples, a threshold is determined based on a historical access pattern (e.g., a historical pattern may vary over time (e.g., weekly, monthly, annually) such that a threshold may be determined based on the time of the week, month, year, etc.). In some examples, the threshold may be determined by accessing a table of thresholds (e.g., categorized by application type, by permission type, by interface to be accessed, etc.).

Suspend permissions that are not utilized within a threshold period of time from occurrence of another event at the site associated with the permission (e.g., a visit to the site by a client, a purchase at the site, performance of a specified action at the site by the client, an addition of an element to the site, etc.). For example, on an e-commerce site, a permission for an application to access an Orders database may be suspended if the permission is not utilized within 24 hours of a new order transaction at the e-commerce site). In some examples, utilizing such an event-based threshold may avoid a permission being suspended on a site that has a low level of activity. For example, if an application is expected to access an API within 24 hours of a new order transaction, but the site is not busy and may not see an order transaction for 90 days, the event-based threshold ensures that the application's permission is not suspended after, for example, more than 30 days passes between accesses (even though the application would access the API within 24 hours of each new order transaction).

Determine a status of a user that assigned the permission and suspend permissions that were assigned by users that are inactive. For example, if a user that authorized permissions is no longer a valid user (e.g., is removed, suspended, demoted to not have permission to assign permissions, inactive, has an expired password, etc.), the permissions assigned by that user may be suspended/revoked/removed.

Determine a status of a site for which the permission is assigned and suspend permissions for sites that are inactive (e.g., have been disabled, have been frozen, have been flagged for security and/or policy violations, have not been accessed for a threshold duration of time, etc.). For example, if a site that is associated with the permission (e.g., the permission authorizes a credential to access information associated with the site) is no longer active (e.g., is removed, suspended, flagged for suspicious and/or malicious activity, inactive, etc.), the permissions assigned for that site may be suspended/revoked/removed.

Figure 5:
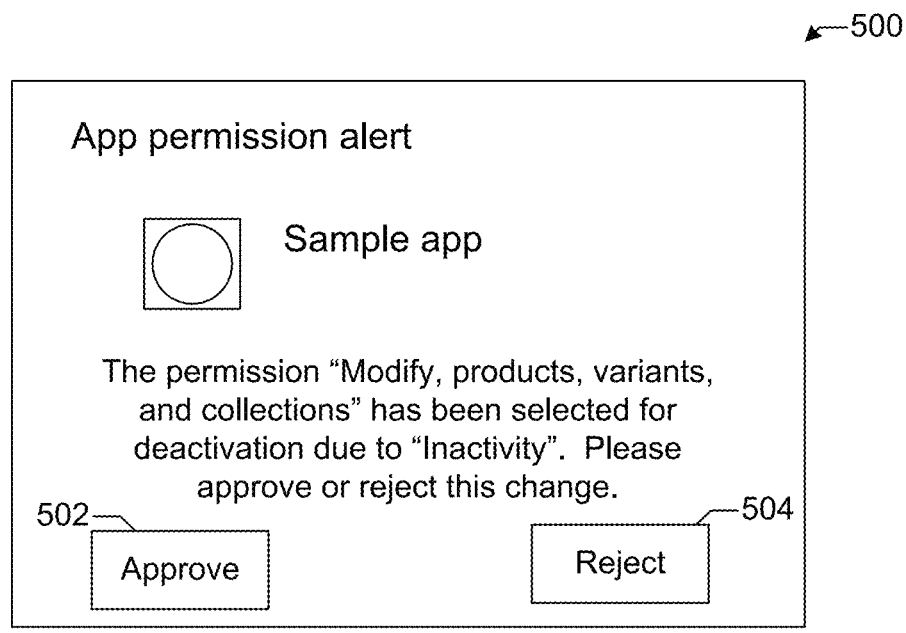
FIG. 5 is an illustration of an example notification of an application permission alert.

The example permission controller 406 may suspend a permission by deleting the permission; flagging the permission is revoked, inactive, disabled, etc.; flagging the permission for review, sending a notification to the administrator 114, etc. An example interface 500 for notifying the administrator 114 is illustrated in FIG. 5. As shown in FIG. 5, the notification interface 500 may identify the application, the permission, and a reason for the notification. In addition, the notification 500 includes an approve button 502 to indicate agreement with and approval of the suspension and a reject button 504 to reject the suspension.

Returning to the example permission controller 406 of FIG. 4, the permission controller 406 of the illustrated example analyzes all permissions for suspension on a periodic basis (e.g., every 1, 5, 30, 60, 90, etc. days). Accordingly, when the time for analysis arrives, all permissions may be analyzed iteratively to identify permissions for suspension (and permissions to be maintained). Alternatively, the permission controller 406 may determine if a permission should be suspended in response to an attempt to utilize the permission (e.g., an attempt by an application to access the interface 140A). For example, an attempt to utilize a permission may be paused (e.g., held, suspended, delayed, etc.) until the analysis of the permission is performed. When the permission is determined to be suspended, the attempt to utilize the permission may be blocked and the permission will be suspended. When the permission is determined to be maintained, the attempt to utilize the permission may be allowed to continue.

In some examples, the example permission controller 406 implements example means for permission control. The means for permission control is implemented by executable instructions such as that implemented by at least blocks 606-616 of FIGS. 6-10. The executable instructions of blocks 606-616 of FIGS. 6-10 may be executed on at least one processor such as the example processor 1112 of FIG. 11. In other examples, the means for permission control is implemented by hardware logic, hardware implemented state machines, logic circuitry, and/or any other combination of hardware, software, and/or firmware.

The example data interface 408 communicatively couples the example permission controller 406 other data components of the example e-commerce platform 100. For example, the data interface 408 may include operations to extract, reformat, convert, etc. data to facilitate use of the data by the example permission controller 406. For example, the data interface 408 may implement an API and/or may access an API of other components to retrieve information.

While an example manner of implementing the application permission monitor 154 of FIG. 1 is illustrated in FIG. 4, one or more of the elements, processes and/or devices illustrated in FIG. 4 may be combined, divided, re-arranged, omitted, eliminated and/or implemented in any other way. Further, the example access monitor 402, the example permission controller 406, the example data interface 408 and/or, more generally, the example application permission monitor 154 of FIG. 4 may be implemented by hardware, software, firmware and/or any combination of hardware, software and/or firmware. Thus, for example, any of the example access monitor 402, the example permission controller 406, the example data interface 408 and/or, more generally, the example application permission monitor 154 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example access monitor 402, the example permission controller 406, the example data interface 408 and/or, more generally, the example application permission monitor 154 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example application permission monitor 154 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the application permission monitor 154 are shown in FIGS. 6-10. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 6-10, many other methods of implementing the example application permission monitor 154 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
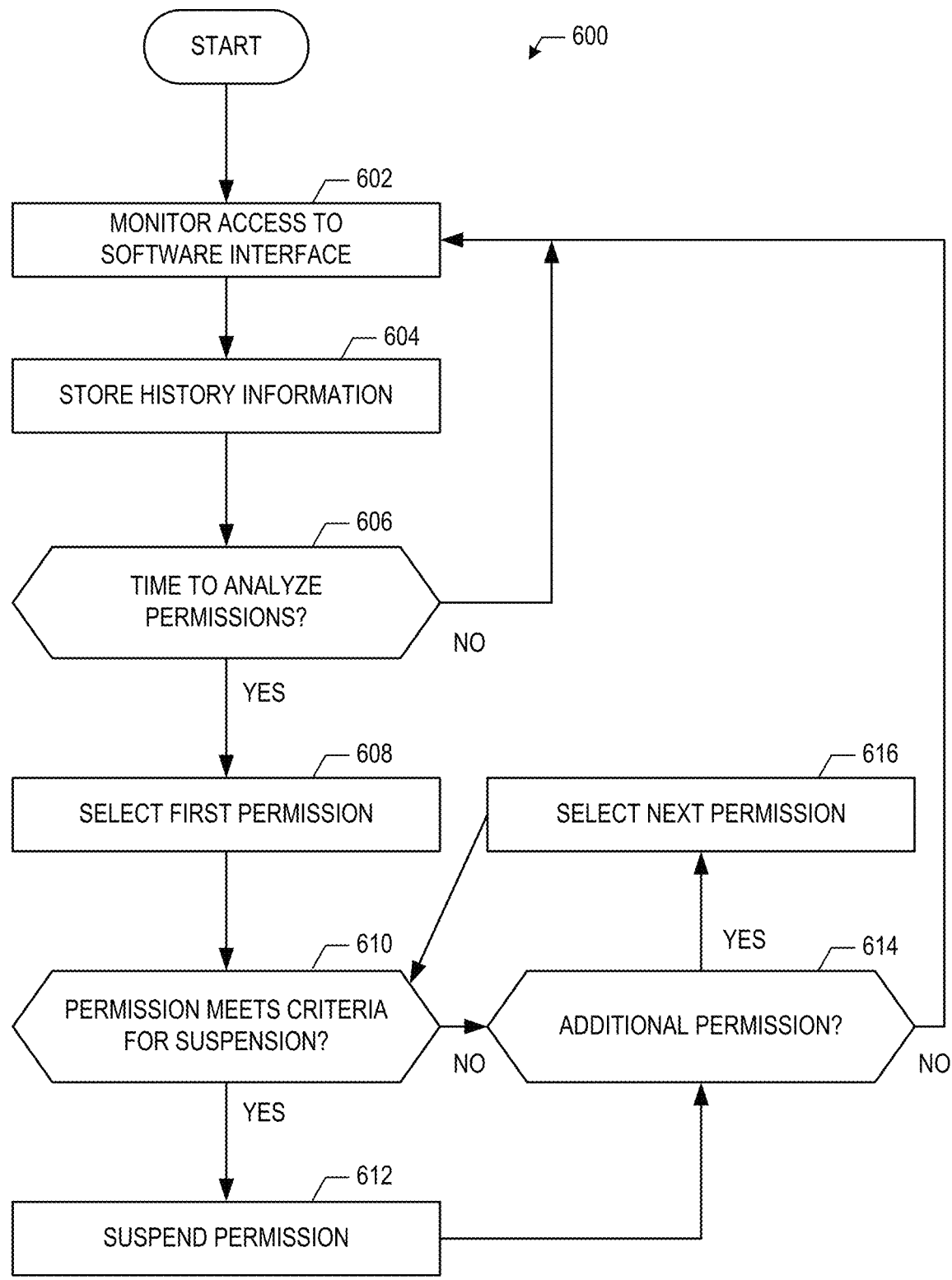
FIGS. 6-10 are flowcharts representative of machine readable instructions that may be executed to implement the application permission monitor of FIG. 1 and/or FIG. 4.

The program of FIG. 6 begins when the access monitor 402 monitors access to the software interface (block 602). For example, the access monitor 402 may register for event notifications from the interface 140A, may snoop communications received at the interface 140A, may monitor an access log of the interface 140A, may register for event notifications that a permission is accessed, may proxy access to the interface 140A, etc. The example access monitor 402 stores collected access information in the example history datastore 404 (block 604).

The example permission controller 406 then determines if it is time to analyze permissions for possible suspension (block 606). For example, the permission controller 406 may determine that it is time to analyze permissions based on a timer expiring or any other event trigger. While the example permission controller 406 is described as determining if it is time to analyze permissions in serial flow with the operation of the access monitor 402, the permission controller 406 may alternatively operate partially or fully in parallel with the operation of the access monitor 402.

When the example permission controller 406 determines that it is not time to analyze permissions (block 606: NO), control returns to block 602 to continue monitoring access.

When the example permission controller 406 determines that it is time to analyze permissions (block 606: YES), the example permission controller selects a first permission (block 608). The example permission controller then determines if the permission meets criteria for suspension (e.g., analyzes data retrieved from the history datastore 404 and/or retrieved via the data interface 408) (block 610). For example, the permission controller 406 may determine that a permission for accessing a software interface such as an API is to be suspended when the permission to access the software interface has not been accessed for a threshold period of time by an application (e.g., even if the application has accessed other software interfaces using the same or a different permission (e.g., permissions to access software interfaces that have been utilized may be maintained while permissions to access software interfaces that have not been utilized may be suspended). Example analyses of whether a permission is to be suspended are described in conjunction FIGS. 7-10.

When the example permission controller 406 determines that a permission is to be suspended (block 610: YES), the permission controller 406 suspends the permission (block 612). For example, the permission may be suspended by removing the permission, removing an authorization associated with a software interface but maintaining the permission credential, setting a flag indicating that the permission is revoked, suspended, etc.

When the permission controller 406 determines that the permission is not to be suspended (block 610: YES) or after the permission is suspended (block 612), the permission controller 406 determines if there is another permission to be analyzed (block 614).

When there are no further permissions to be analyzed (block 614: NO), control returns to block 602 to continue to monitor access to software interfaces.

When there are further permissions to be analyzed (block 614: YES), the permission controller 406 selects a next permission (block 614) and control returns to block 610 to analyze the next permission.

FIGS. 7-10 illustrate example machine-readable instructions that may be executed to implement block 610 of FIG. 6 to determine if a permission should be suspended.

Figure 7:
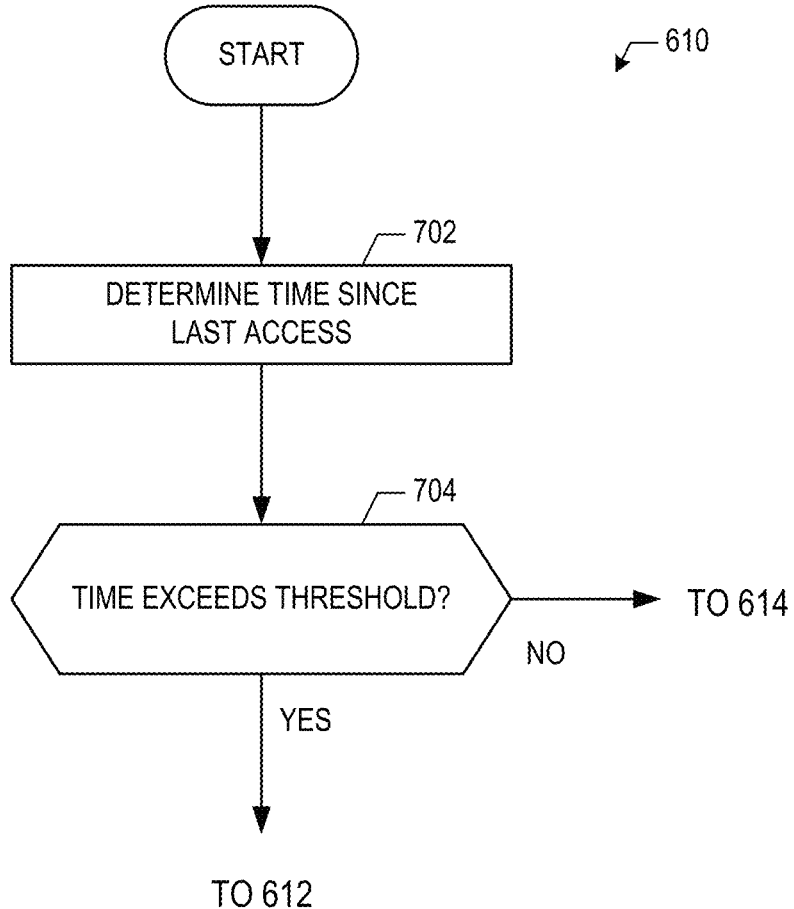

FIG. 7 illustrates an example implementation of block 610 of FIG. 6. According to the illustrated example of FIG. 7, to analyze whether a permission is to be suspended, the example permission controller 406 determines a time since a last access of an interface using the permission (block 702). For example, the permission controller 406 may determine a number of days, weeks, months, etc. between the current date/time and a timestamp of a last access stored in the history datastore 404. The example permission controller 406 then determines if the determined time exceeds a threshold (block 704). For example, the permission controller 406 may determine if more than the threshold number of days have passed. Alternatively, the permission controller 406 may determine if a value is greater than, less than, equal to, etc. a threshold.

When the time exceeds the threshold (block 704: YES), control proceeds to block 612 to suspend the permission. When the time does not exceed the threshold (block 704: NO), control proceeds to block 614 to determine if there are further permissions to be analyzed.

Figure 8:
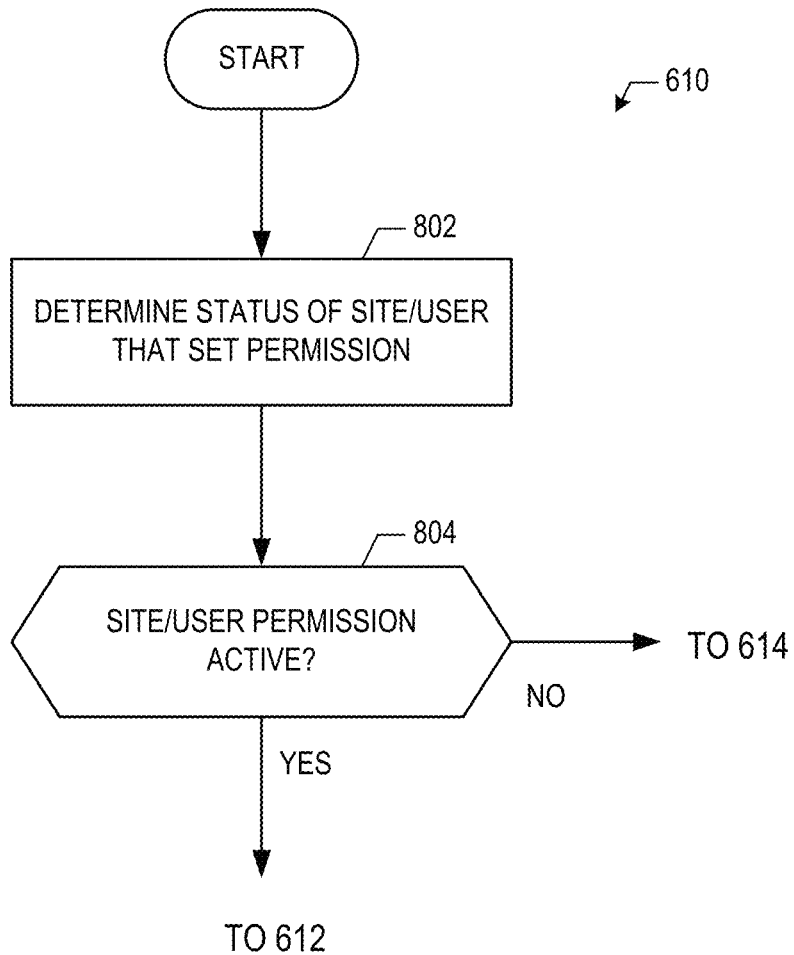

FIG. 8 illustrates an example implementation of block 610 of FIG. 6. According to the illustrated example of FIG. 8, to analyze whether a permission is to be suspended, the example permission controller 406 determines a status of the site and/or user that set/assigned the permission (block 802). For example, a user may authorize an application access a data interface (e.g., a customer data API) of a site. Such user and/or site may subsequently be deactivated, suspended, disabled, deleted, identified as a security threat, etc. The example permission controller 406 then determines if the site and/or user is active (block 804).

When the site and/or the user is not active (e.g., inactive, suspended, blocked, etc.) (block 804: NO), control proceeds to block 612 to suspend the permission. When the site and/or user are active (block 804: YES), control proceeds to block 614 to determine if there are further permissions to be analyzed.

Figure 9:
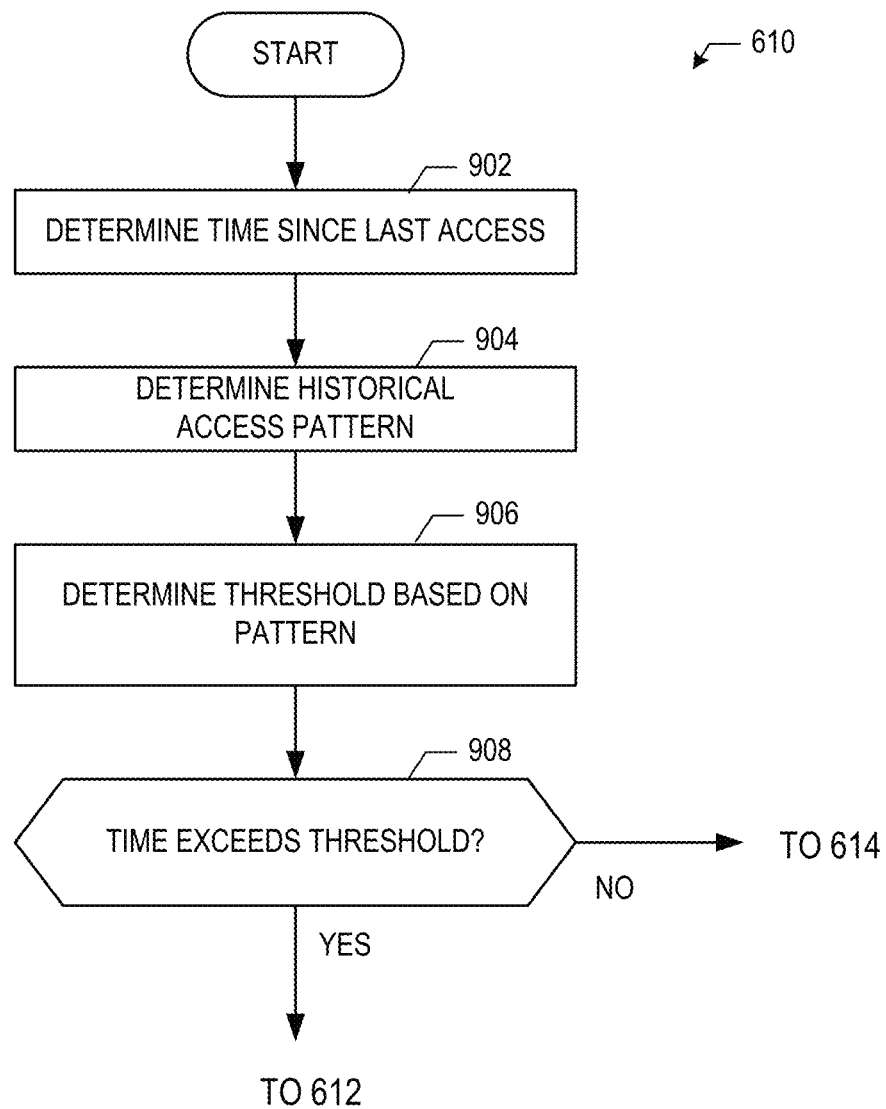

FIG. 9 illustrates an example implementation of block 610 of FIG. 6. According to the illustrated example of FIG. 9, to analyze whether a permission is to be suspended, the example permission controller 406 determines a time since a last access of an interface using the permission (block 902). For example, the permission controller 406 may determine a number of days, weeks, months, etc. between the current date/time and a timestamp of a last access stored in the history datastore 404. The example permission controller 406 then determines a historical access pattern associated with the permission (block 904). For example, an access pattern may be a pattern of monthly access, yearly access, an average time between accesses, etc. The example permission controller 406 then determines a threshold based on the pattern (block 906). For example, a threshold may be set as: average time period between accesses+a percentage of average time period between accesses. In a particular example, if the average time between accesses in the historical data is found to be 25 days, and the percentage used is 20%, the threshold may be set as 25+(0.20×25)=30 days. The threshold may alternatively be set based on a pattern (e.g., daily, monthly, yearly, etc. access) such that the permission may be suspended if an access has not occurred during the prior day/month/year, etc. Alternatively, the threshold may be determined based on another heuristic such as a maximum historical duration of time between accesses, by determining a $99^{th}$ percentile (or other percentile) historical time between accesses, by calculating a $3^{rd}$ standard deviation (or other standard deviation) of historical duration of time between accesses, etc.

The example permission controller 406 then determines if the determined time exceeds the threshold (block 906). For example, the permission controller 406 may determine if more than the threshold number of days have passed. Alternatively, the permission controller 406 may determine if a value is greater than, less than, equal to, etc. a threshold.

When the time exceeds the threshold (block 906: YES), control proceeds to block 612 to suspend the permission. When the time does not exceed the threshold (block 906: NO), control proceeds to block 614 to determine if there are further permissions to be analyzed.

Figure 10:
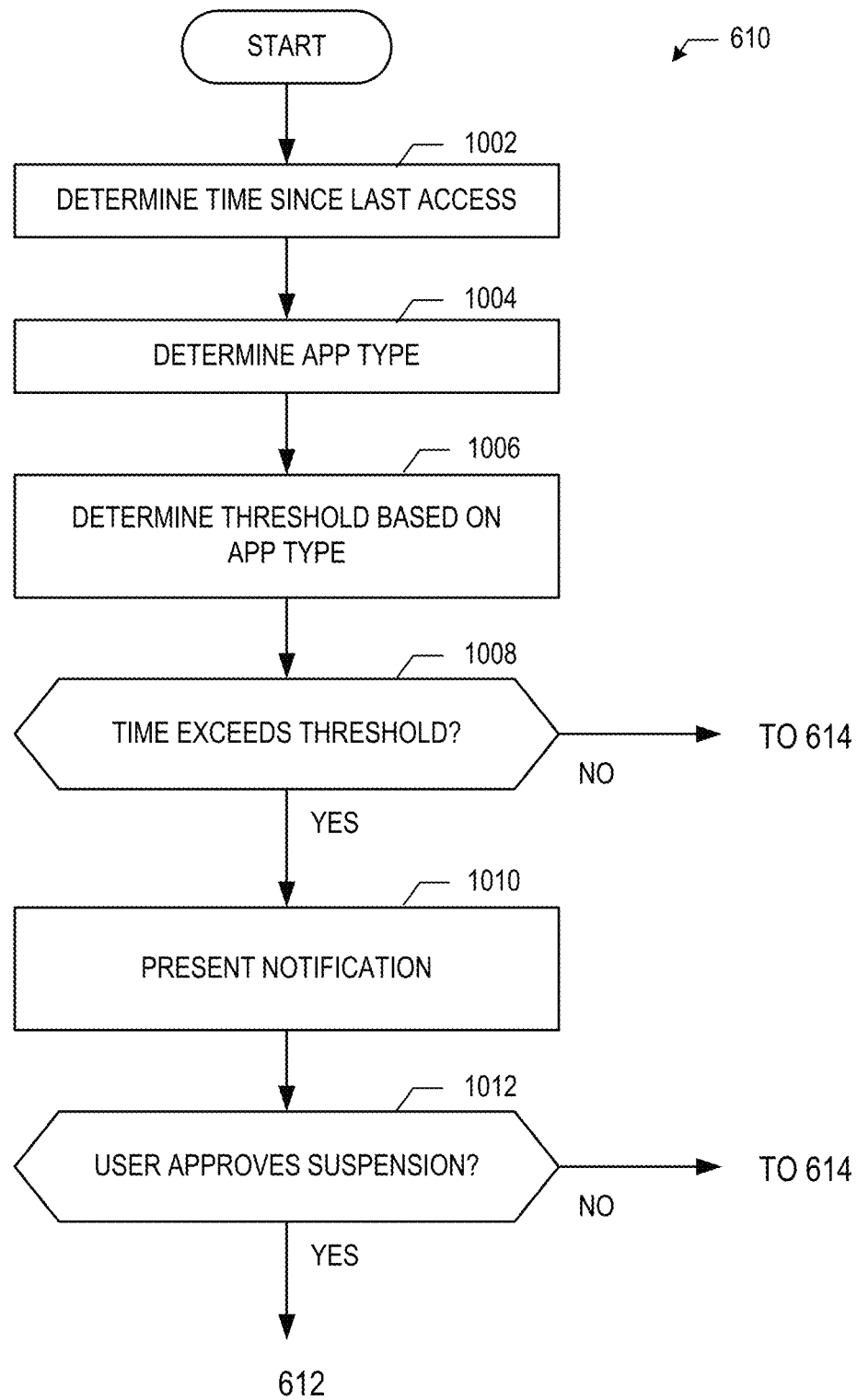

FIG. 10 illustrates an example implementation of block 610 of FIG. 6. According to the illustrated example of FIG. 10, to analyze whether a permission is to be suspended, the example permission controller 406 determines a time since a last access of an interface using the permission (block 1002). For example, the permission controller 406 may determine a number of days, weeks, months, etc. between the current date/time and a timestamp of a last access stored in the history datastore 404. The example permission controller 406 then determines an application type (block 1004). For example, the application may be associated with a category (e.g., data regarding the application type may be retrieved from the application, from an application store, etc.

The example permission controller then determines a threshold based on the application type (block 1006). For example, the permission controller 406 may access a look-up-table of thresholds associated with application types. For example, an application that facilitates preparation of annual tax information may be expected to access an interface only once a year and may be associated with a 13 month threshold whereas an application that analyzes customer details to detect fraud may be expected to access data every day and/or access data within a period of time from a last transaction and will be associated with a threshold of one day or a threshold that is equal the time since a last transaction plus one day.

For example, an access pattern may be a pattern of monthly access, yearly access, an average time between accesses, etc. The example permission controller 406 then determines a threshold based on the pattern (block 1006). For example, a threshold may be set as: average time period between accesses+a percentage of average time period between accesses. In a particular example, if the average time between accesses in the historical data is found to be 25 days, and the percentage used is 20%, the threshold may be set as 25+(0.20×25)=30 days. The threshold may alternatively be set based on a pattern (e.g., daily, monthly, yearly, etc. access) such that the permission may be suspended if an access has not occurred during the prior day/month/year, etc.

The example permission controller 406 then determines if the determined time exceeds the threshold (block 1008). For example, the permission controller 406 may determine if more than the threshold number of days have passed.

Alternatively, the permission controller 406 may determine if a value is greater than, less than, equal to, etc. a threshold.

When the time exceeds the threshold (block 1008: YES), the example permission controller 406 presents a notification to the administrator 114 (or another managing user) that the permission has been identified for suspension (block 1010). For example, the notification illustrated in FIG. 5 may be presented. Alternatively, any other notification and/or type of notification (e.g., email, text message, instant message, popup window, web notification, etc.) may be presented. The example notification includes inputs for the user to provide a response approving or rejecting a suspension. For example, the notification of FIG. 5 includes buttons. Alternatively, a user may click a link, type a response/command, etc. The example permission controller 406 determines if the user has approved or rejected the suspension (block 1012).

When the user approves the suspension (block 1012: YES), control proceeds to block 612 to suspend the permission. When the user rejects the suspension (block 1012: NO), control proceeds to block 614 to determine if there are further permissions to be analyzed.

While FIG. 10 illustrates an example in which a notification is presented prior to suspension of a permission, such notification and approval steps may be incorporated with any of the example processes of FIGS. 6-9 and/or any other suspension process. Furthermore, while individual processes are illustrated in FIGS. 7-10, any of the processes and analyses may be combined. For example, the various approaches for determining whether to suspend may be combined (e.g., by applying weighting to the individual determinations). Each determination may be associated with a score and that total score may be compared with a threshold. In some embodiments, a machine learning algorithm may be utilized to determine such weighting and/or thresholds based on historical data. Such historical data may be collected from a single e-commerce platform (or other type of platform) and/or from multiple e-commerce platforms (or other platforms). In some examples, a fixed weight may be assigned to each heuristic.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include $4^{th}$ Generation (4G) networks (e.g., Long Term Evolution (LTE)) or $5^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Figure 11:
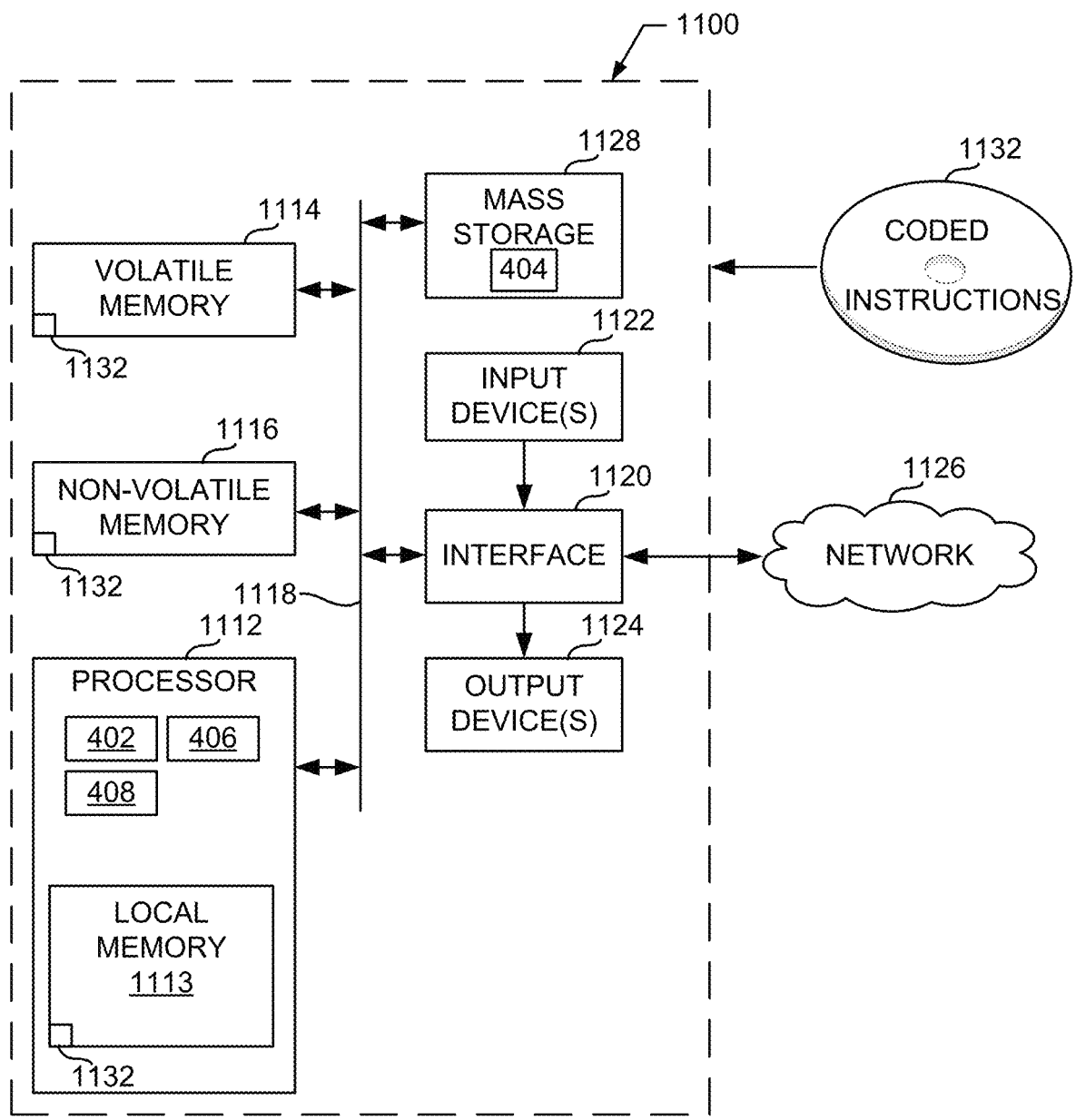
FIG. 11 is a block diagram of an example processing platform structured to execute the instructions of FIGS. 6-10 to implement the application permission monitor FIG. 1 and/or FIG. 2.

Furthermore, FIG. 11 is a block diagram of an example processor platform 1100 structured to execute the instructions of FIG. 11 to implement the application permission controller 154 of FIGS. 1 and/or 4. The processor platform 1100 can be, for example, a server, a personal computer, a workstation, a self-learning machine (e.g., a neural network), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the access monitor 402, the permission controller 406, and the data interface 408.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. The example mass storage 1128 stores the example history datastore 404.

The machine executable instructions 1132 may be the machine-readable instructions represented in FIGS. 6-10 may be stored in the mass storage device 1128, in the volatile memory 1114, in the non-volatile memory 1116, and/or on a removable non-transitory computer readable storage medium such as a CD or DVD.

Figure 12:
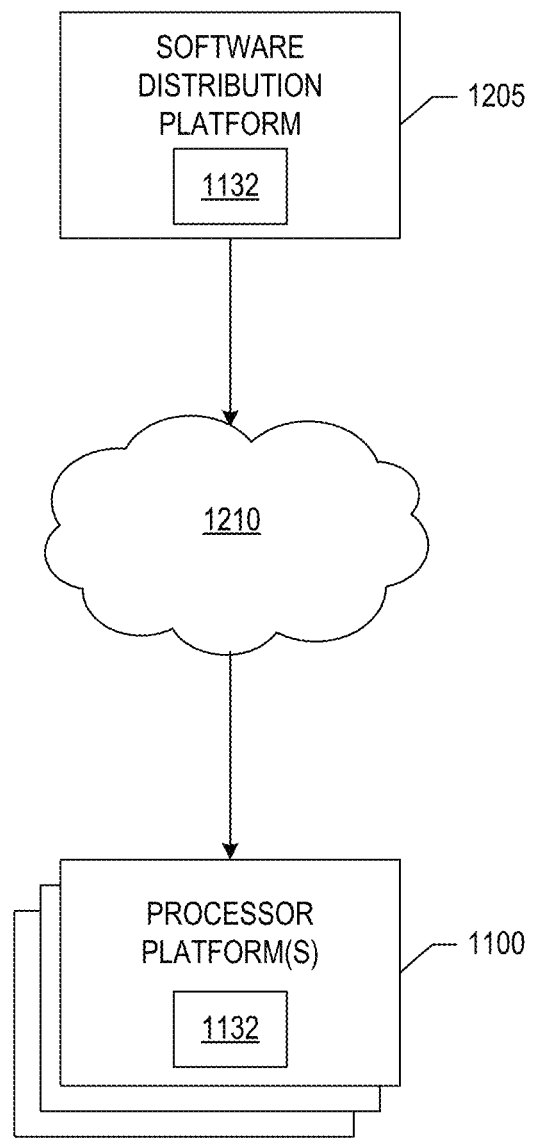
FIG. 12 is a block diagram of an example software distribution platform to distribute software (e.g., software corresponding to the example computer readable instructions of FIGS. 6-10) to an e-commerce platform, a Software as a Service system, or any other computing system.

A block diagram illustrating an example software distribution platform 1205 to distribute software such as the example computer readable instructions 1132 of FIG. 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1132 of FIG. 11. The third parties may be consumers, users, retailers, OEMs, etc., who purchase and/or license the software for use and/or re-sale and/or sub-licensing. For example, an owner of an e-commerce platform similar to the e-commerce platform 100 may obtain the software from the software distribution platform 1205 to add the application permission monitor 154 to the e-commerce platform.

In the illustrated example, the software distribution platform 1205 includes one or more servers and one or more storage devices. The storage devices store the computer readable instructions 1132, which may correspond to the example computer readable instructions of FIGS. 6-10, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1132 from the software distribution platform 1205. For example, the software, which may correspond to the example computer readable instructions of FIG. 6-10, may be downloaded to the example processor platform 1100, which is to execute the computer readable instructions 1132 to implement the application permission controller 154. In some example, one or more servers of the software distribution platform 1205 periodically offer, transmit, and/or force updates to the software (e.g., the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that restrict application access in a networked environment. The disclosed methods, apparatus and articles of manufacture improve the efficiency of using a computing device by removing excess (e.g., un-needed) permissions that are assigned to applications (e.g., potentially without the need for user intervention). The disclosed methods, apparatus and articles of manufacture are accordingly directed to one or more improvement(s) in the functioning of a computer. Furthermore, methods, apparatus, and articles of manufacture set forth herein enable permissions assigned to an application to be retired, revoked, reduced, etc. over time as the permissions that are actually utilized and/or utilized in an expected manner are maintained. Accordingly, reducing the number of permissions available may reduce the number of security vulnerabilities that may be presented by a credential providing an application, plugin, or other entity/object with access to information.

According to the subject matter of the present application, there may be provided a method of managing permissions. The method may include monitoring accesses made using a credential to a first set of one or more application programming interfaces (APIs) and a second set of one or more APIs. The credential may be associated with a first permission for access to the first set of one or more APIs and with a second permission for access to the second set of one or more APIs. The method may further include determining, based on access to one or more APIs of the first set of one or more APIS using the credential, that the first permission is to be suspended. In response to the determination that the first permission is to be suspended, the first permission may be suspended while maintaining the second permission.

In some implementations, determining that the first permission is to be suspended may include determining an amount of time since a last access to the first set of one or more APIs using the credential.

In some implementations, determining that the first permission is to be suspended includes determining that that the amount of time exceeds a threshold.

In some implementations, the threshold is determined based on a pattern of historical access to the first set of one or more APIs.

In some implementations, the pattern of historical access corresponds to a frequency of access.

In some implementations, the threshold is determined using machine learning analysis of the historical access to identify the pattern.

In some implementations, the threshold is determined based on an average of a duration of time between accesses associated with the first permission using the credential.

In some implementations, the threshold is further determined based on a standard deviation of a duration of time between accesses associated with the permission using the credential.

In some implementations, suspending the first permission includes triggering presentation of a notification for suspending the first permission and receiving a user response in response to the notification.

In some implementations, determining that the first permission is to be suspended is further based on a status of a user who assigned the first permission to the credential.

In some implementations, determining that the first permission is to be suspended is further based on an access pattern associated with the first set of one or more APIs.

In some implementations, the credential is an application programming interface key and the accesses are requests including the application programming interface key sent from an application.

According to the subject matter of the present application, there may be provided an apparatus for managing permissions. The apparatus may include an access monitor to monitor accesses made using a credential to a first set of one or more application programming interfaces (APIs) and a second set of one or more APIs. The credential may be associated with a first permission for access to the first set of one or more APIs and with a second permission for access to the second set of one or more APIs. The apparatus may further include a permission controller to determine, based on access to one or more APIs of the first set of one or more APIs using the credential, that the first permission is to be suspended. The permission controller may further, in response to the determination that the first permission is to be suspended, suspending the first permission while maintaining the second permission.

In some implementations, the permission controller is to determine an amount of time since a last access to the first set of one or more APIs using the credential.

In some implementations, the determination that the first permission is to be suspended includes determining that that the amount of time exceeds a threshold.

In some implementations, the threshold is determined based on a pattern of historical access to the first set of one or more APIs.

In some implementations, the pattern of historical access corresponds to a frequency of access.

In some implementations, suspending the first permission includes triggering presenting of a notification for suspending the first permission.

According to the subject matter of the present application, there may be provided a non-transitory computer readable storage medium comprising instructions that, when executed, cause a machine to manage permissions. The instructions, when executed, may cause the machine to monitor accesses made using a credential to a first set of one or more application programming interfaces (APIs) and a second set of one or more APIs. The credential may be associated with a first permission for access to the first set of one or more APIs and with a second permission for access to the second set of one or more APIs. The instructions, when executed, may further cause the machine to determine, based on access to one or more APIs of the first set of one or more APIs using the credential, that the first permission is to be suspended. The instructions, when executed, may further cause the machine to, in response to the determination that the first permission is to be suspended, suspend the first permission while maintaining the second permission.

In some implementations, determining that the first permission is to be suspended includes determining an amount of time since a last access to the first set of one or more APIs using the credential.

According to the subject matter of the present application, there may be provided a non-transitory computer readable storage medium comprising instructions that, when executed, cause a machine to perform any of the operations of the methods described above.

According to the subject matter of the present application, there may be provided a computer system for managing permissions. The computer system may include a processor and a computer-readable medium storing instructions that, when executed by the processor, cause the computer system to perform any of the operations of the methods described above.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method of managing permissions, the method comprising:
    monitoring accesses made using a credential to a first set of one or more application programming interfaces (APIs) and a second set of one or more APIs, the credential assigned by a user with a valid status associated with a first permission for access to the first set of one or more APIs and with a second permission for access to the second set of one or more APIs;
    determining, based on access to one or more APIs of the first set of one or more APIs using the credential and based on a non-valid user status of the user who assigned the first permission to the credential, that the first permission is to be suspended; and
    in response to the determination that the first permission is to be suspended, suspending the first permission while maintaining the second permission.

2. The method of claim 1, wherein determining that the first permission is to be suspended includes determining an amount of time since a last access to the first set of one or more APIs using the credential.

3. The method of claim 2, wherein determining that the first permission is to be suspended includes determining that that the amount of time exceeds a threshold.

4. The method of claim 3, wherein the threshold is determined based on a pattern of historical access to the first set of one or more APIs.

5. The method of claim 4, wherein the pattern of historical access corresponds to a frequency of access.

6. The method of claim 4, wherein the threshold is determined using machine learning analysis of the historical access to identify the pattern.

7. The method of claim 4, wherein the threshold is determined based on an average of a duration of time between accesses associated with the first permission using the credential.

8. The method of claim 4, wherein the threshold is further determined based on a standard deviation of a duration of time between accesses associated with the first permission using the credential.

9. The method of claim 1, wherein suspending the first permission includes triggering presentation of a notification for suspending the first permission and receiving a user response in response to the notification.

10. The method of claim 1, wherein determining that the first permission is to be suspended is further based on an access pattern associated with the first set of one or more APIs.

11. The method of claim 1, wherein the credential is an application programming interface key and the accesses are requests including the application programming interface key sent from an application.

12. A computer system comprising:
    at least one processor;
    a computer-readable medium storing instructions that, when executed by the at least one processor, cause the computer system to:
        monitor accesses made with a credential to a first set of one or more application programming interfaces (APIs) and a second set of one or more APIs, the credential assigned by a user with a valid status associated with a first permission for access to the first set of one or more APIs and with a second permission for access to the second set of one or more APIs;
        determine, based on access with the credential to one or more APIs of the first set of one or more APIs and based on a non-valid user status of a user who assigned the first permission to the credential, that the first permission is to be suspended; and
        in response to the determination that the first permission is to be suspended, suspend the first permission while the second permission is maintained.

13. The computer system of claim 12, wherein the instructions, when executed, cause the computer system to determine an amount of time since a last access with the credential to the first set of one or more APIs.

14. The computing system of claim 13, wherein the instructions, when executed, cause the computer system to determine that the amount of time exceeds a threshold.

15. The computer system of claim 14, wherein the threshold is determined based on a pattern of historical access to the first set of one or more APIs.

16. The computer system of claim 15, wherein the pattern of historical access corresponds to a frequency of access.

17. The computer system of claim 12, wherein instructions, when executed, cause the computer system to trigger presentation of a notification for suspension of the first permission.

18. A non-transitory computer readable storage medium comprising instructions that, when executed, cause a machine to at least:
    monitor accesses made using a credential to a first set of one or more application programming interfaces (APIs) and a second set of one or more APIs, the credential assigned by a user with a valid status associated with a first permission for access to the first set of one or more APIs and with a second permission for access to the second set of one or more APIs;

determine, based on access to one or more APIs of the first set of one or more APIs using the credential and based on a non-valid user status of a user who assigned the first permission to the credential, that the first permission is to be suspended; and in response to the determination that the first permission is to be suspended, suspend the first permission while maintaining the second permission.

19. The non-transitory computer readable storage medium of claim 18, wherein determining that the first permission is to be suspended includes determining an amount of time since a last access to the first set of one or more APIs using the credential.

\* \* \* \* \*